(12) United States Patent
Titus

(10) Patent No.: US 7,467,139 B1
(45) Date of Patent: Dec. 16, 2008

(54) LIBRARY LOCK MANAGEMENT

(75) Inventor: Scott L. Titus, Shakopee, MN (US)

(73) Assignee: Unisys Corporation, Blue Bell, PA (US)

( * ) Notice: Subject to any disclaimer, the term of this patent is extended or adjusted under 35 U.S.C. 154(b) by 781 days.

(21) Appl. No.: 10/011,043

(22) Filed: Nov. 13, 2001

(51) Int. Cl.
*G06F 7/00* (2006.01)
*G06F 12/06* (2006.01)

(52) U.S. Cl. .............................. 707/8; 711/5
(58) Field of Classification Search ................ 395/606; 707/9, 4, 8; 718/101; 717/163, 122; 709/224; 711/5
See application file for complete search history.

(56) References Cited

U.S. PATENT DOCUMENTS

| | | | |
|---|---|---|---|
| 4,181,937 A | 1/1980 | Hattori et al. ............. 364/200 |
| 5,062,045 A * | 10/1991 | Janis et al. .................... 707/9 |
| 5,649,185 A * | 7/1997 | Antognini et al. ............ 707/9 |
| 5,734,886 A * | 3/1998 | Grosse et al. ................. 707/4 |
| 5,799,206 A * | 8/1998 | Kitagawa et al. ............ 710/36 |
| 5,875,343 A * | 2/1999 | Binford et al. ............. 710/263 |
| 5,884,323 A * | 3/1999 | Hawkins et al. ............ 707/201 |
| 5,893,905 A * | 4/1999 | Main et al. .................... 705/11 |
| 5,999,990 A * | 12/1999 | Sharrit et al. .................. 710/8 |
| 6,101,533 A | 8/2000 | Brandt et al. .............. 709/213 |
| 6,108,692 A | 8/2000 | Van Seters et al. ......... 709/213 |
| 6,161,152 A * | 12/2000 | Garg et al. .................... 710/46 |
| 6,275,921 B1 * | 8/2001 | Iwata et al. ................... 712/24 |
| 6,411,981 B1 * | 6/2002 | Klein et al. ................. 718/101 |
| 6,567,180 B1 * | 5/2003 | Kageyama et al. ......... 358/1.15 |
| 6,637,023 B1 * | 10/2003 | Ginsberg .................... 717/122 |
| 6,976,072 B2 * | 12/2005 | Mathieson ................. 709/224 |
| 2001/0034883 A1 * | 10/2001 | Zigmond .................... 725/109 |

* cited by examiner

*Primary Examiner*—Meng-Ai An
*Assistant Examiner*—Camquy Truong
(74) *Attorney, Agent, or Firm*—Charles A. Johnson; Robert Marley; Nawrocki, Rooney & Sivertson PA

(57) ABSTRACT

An apparatus for and method of permitting the maintenance/control console of a large scale mainframe computer to list the contents of program libraries in the demand or even batch mode with minimum operational impact. The preferred mode of the present invention permits the maintenance and operations personnel to list, pause, and perform other functions without unduly preventing user applications from needed accesses to the libraries.

18 Claims, 13 Drawing Sheets

LIBRARY LOCK MANAGEMENT

BACKGROUND OF THE INVENTION

1. Field of the Invention

The present invention generally relates to large scale operating systems and more particularly relates to enhancements for accommodating maintenance, administration, and control.

2. Description of the Prior Art

Large scale data processing systems are well known in the data processing art. Such commercial systems have been in general use for more than 30 years. Some of the most successful large scale data processing systems are available from Unisys Corporation.

One of the great advantages of such large scale systems is the availability of software libraries. These libraries are collections of software programs offering a wide diversity of functionality. Because these systems are relatively large, the corresponding library collections can become very large. The HVTIP (High Volume Transaction Internet Processing) library available from Unisys Corporation accommodates up to 16,383 different library programs. Each addition to the library represents one or more functions available to subsequent users without the need to ever again code and debug the script needed to provide that function(s).

Techniques for handling libraries tend to be a function of the library size. As the size of the library increases, different methods are required to produce acceptable efficiencies. U.S. Pat. No. 6,101,533, issued to Brandt et al; U.S. Pat. No. 6,108,692, issued to Van Seters et al; and U.S. Pat. No. 4,181,937, issued to Hattori et al each discuss various aspects for handling on-line libraries.

Whenever the control console of the system needs to access the libraries for periodic maintenance or system updates, the libraries must be locked out from access by any applications. Obviously, accesses cannot be permitted, particularly when system repair and regeneration is in process. Therefore, if the libraries were simply to be listed on the maintenance console or printed on the maintenance console printer, the libraries can be unavailable to calling applications for an extended period of time.

If all user accesses to the libraries are prohibited during control console access (as is required during maintenance sessions), the libraries become unavailable for however long it takes to complete the maintenance task involving the system console library access. This wait time is further lengthened to the extent that the maintenance programs which utilize the libraries are accorded a priority which is lower than other occurrences within the system. On the other hand, it can become highly inefficient to always grant highest priority to certain maintenance tasks which may be routine in nature.

Thus, with a potential library having in excess of 16,000 separate programs, simply listing them on a printer from a routine maintenance program operating in the demand batch mode can effectively tie up the entire system for an inordinate period of time.

SUMMARY OF THE INVENTION

The present invention overcomes the disadvantages of the prior art by providing a method of and apparatus for improved control over the access of library data from a control or maintenance console, which minimizes the unavailability of the libraries to applications caused by administration and maintenance of the system. The considerable advantages of this approach are increased as the size of the system and size of corresponding libraries are increased. In particular, the preferred mode of the present invention provides enhanced listing of libraries from the command console and efficient printing of this list.

In a mainframe demand session, each line of output produced by the TPUR (transaction processing utility routines) command is stored in a buffer accessible by the command activity and the printing activity. If a buffer is full, it is added to a linked list of output buffers and another buffer is acquired for more output. If the command is complete, the current buffer is added to the linked list of output buffers.

When the user in a demand session issues a command, the PrintLong function will activate the printing activity if not already activated and post the start printing event. This event wakes up the printing activity which starts looking for buffers in the output linked list. When the printing activity notices a buffer on the output list, it will remove the buffer from the list and start printing the contents. When the contents are printed are discarded, the next buffer is taken from the list.

If the user chooses to stop printing on a non-critical TPUR command, the printing activity informs the command activity to stop producing output, and the remaining buffers on the list are removed from the output linked list.

If the TPUR command is critical, all output will be produced by the command activity. If the user chooses to stop printing, the remaining buffers are discarded, as well as any buffers that are added to the list of buffers.

When a buffer is removed from the output buffer linked list, it remains in the memory-linked list. When another buffer is needed, an unused buffer from the memory list is used if one is found. If one is not found, a new buffer is acquired from system memory. This minimizes the impact of acquiring system memory.

In order to keep the integrity of the output buffer list, the modify lock is used to lock out the other activity when buffers are removed or added to the output list. This lock is also used whenever a buffer is acquired or released. In order to keep the integrity of the underlying system structures.

If the user decides to disable the output pause functionality, the pause permitted flag is cleared. This informs the command activity to stop sending output to the printing activity. The printing activity finishes printing the remaining output in the output buffer list. After this is done, the printing activity becomes dormant and the command activity then prints the remaining output directly. The done printing event is used to inform the printing activity to become dormant when there are no more buffers in the output list. While the printing activity is sending output to the display, it has the print lock. Right before the printing activity becomes dormant, it releases the print lock so the command activity can finish sending output to the display.

The stop printing flag is used by the printing activity to inform the command activity to stop producing output if the user decides to stop displaying output. When the stop printing flag is set to the current library number, the command activity will stop producing output until a new library or a new command is processed.

The new command flag is used to signify that a new TPUR command is being processed. This flag informs the command activity to put the remaining output in the buffer on the output list so that the printing activity can then finish printing the current TPUR command. This eliminates the possibility of mixing output of a current command with output from the next command.

If the TPUR session is in batch mode, in demand mode executed by an @add stream, or in demand mode being breakpointed, all output is immediately performed, and no pausing will occur.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 2, having

FIG. 3, having

DETAILED DESCRIPTION OF THE PREFERRED EMBODIMENTS

Figure 1:
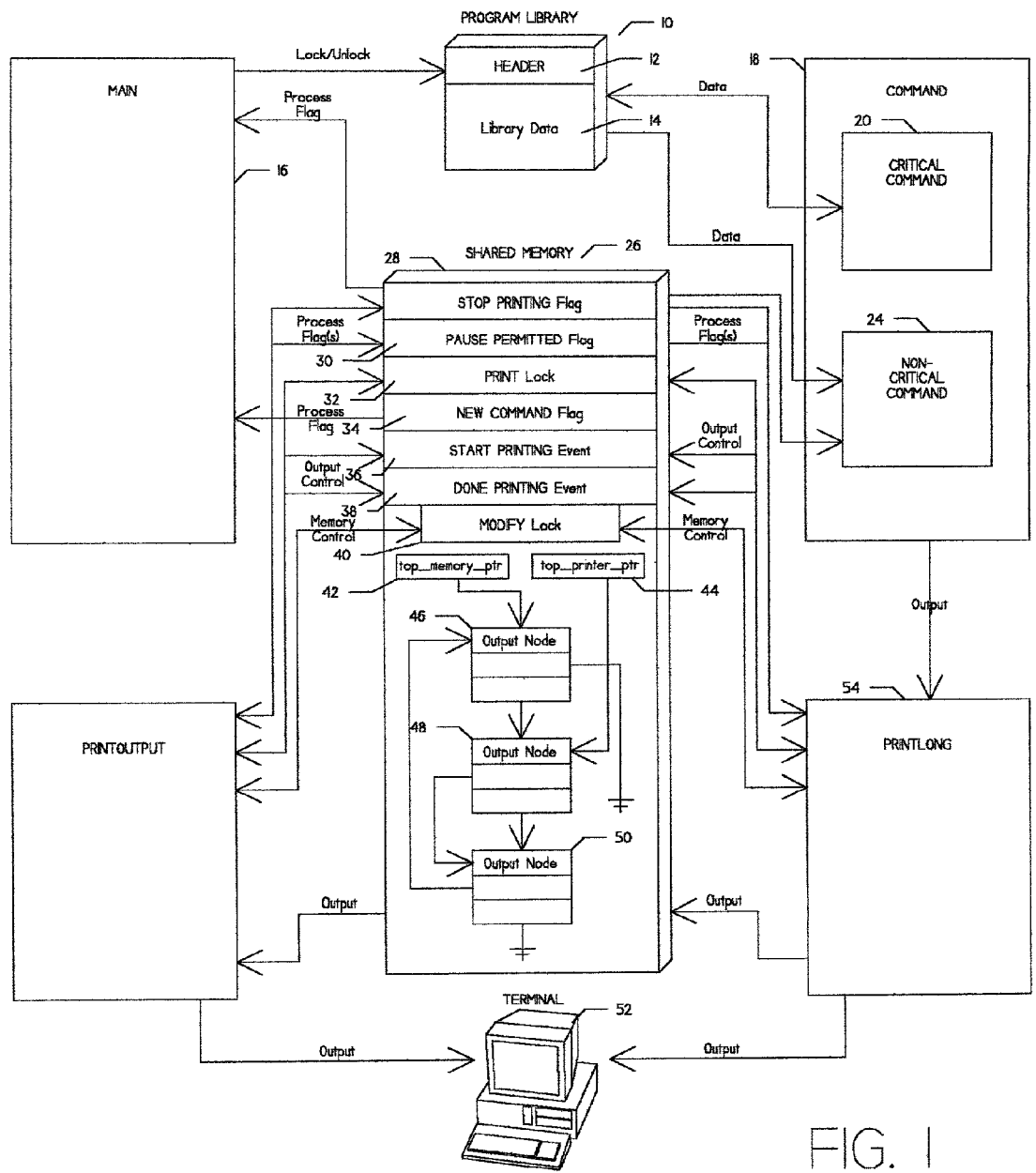
FIG. 1 is a detailed block diagram showing the interrelationships of the major components of the present invention.

FIG. 1 is detailed block diagram showing the major components of the preferred mode of the present invention. Terminal 52 is a control/maintenance console from which the library listing is requested and controlled. In the preferred mode, it is implemented within an industry standard personal computer which has been programmed to provide the control/maintenance console functions.

The software program, Main 16, is the primary control and sequencing for the enhanced listing process. A more detailed description is found in FIG. 4 and the associated discussion below. Command 18 is the software package which processes the commands associated with initiation and control of the library listing process. It consists of separate modules, Critical Command 20 and Non-Critical Command 24. Detailed views of each may be found in FIG. 6 and FIG. 8, respectively.

The detailed logic for controlling the library list printing process and its options is located within PrintLong 54. A complete discussion of PrintLong 54 is provided by FIG. 2 (including FIGS. 2A and 2B), along with the associated explanation below. Similarly, the software package, Print Output, controls the printing process. This logic is presented in greater detail in FIG. 3, containing FIGS. 3A, 3B, 3C, and 3D, and the corresponding discussion below.

Shared Memory 26 contains the controlling flags and buffers required to coordinate the enhanced library listing procedure. The various required flags include: STOP Printing Flag 28, PAUSE PERMITTED Flag 30, PRINT Lock 32, NEW COMMAND Flag 34, START PRINTING Event 36, DONE PRINTING Event 38, and MODIFY Lock 40. The function of each of these indicators is found within the detailed description below.

Shared Memory 26 also contains the main printing buffers. These include Output Node 46, Output Node 48, and Output Node 50. Again, a more detailed description of the operation of these buffers is found below.

Figure 2A:
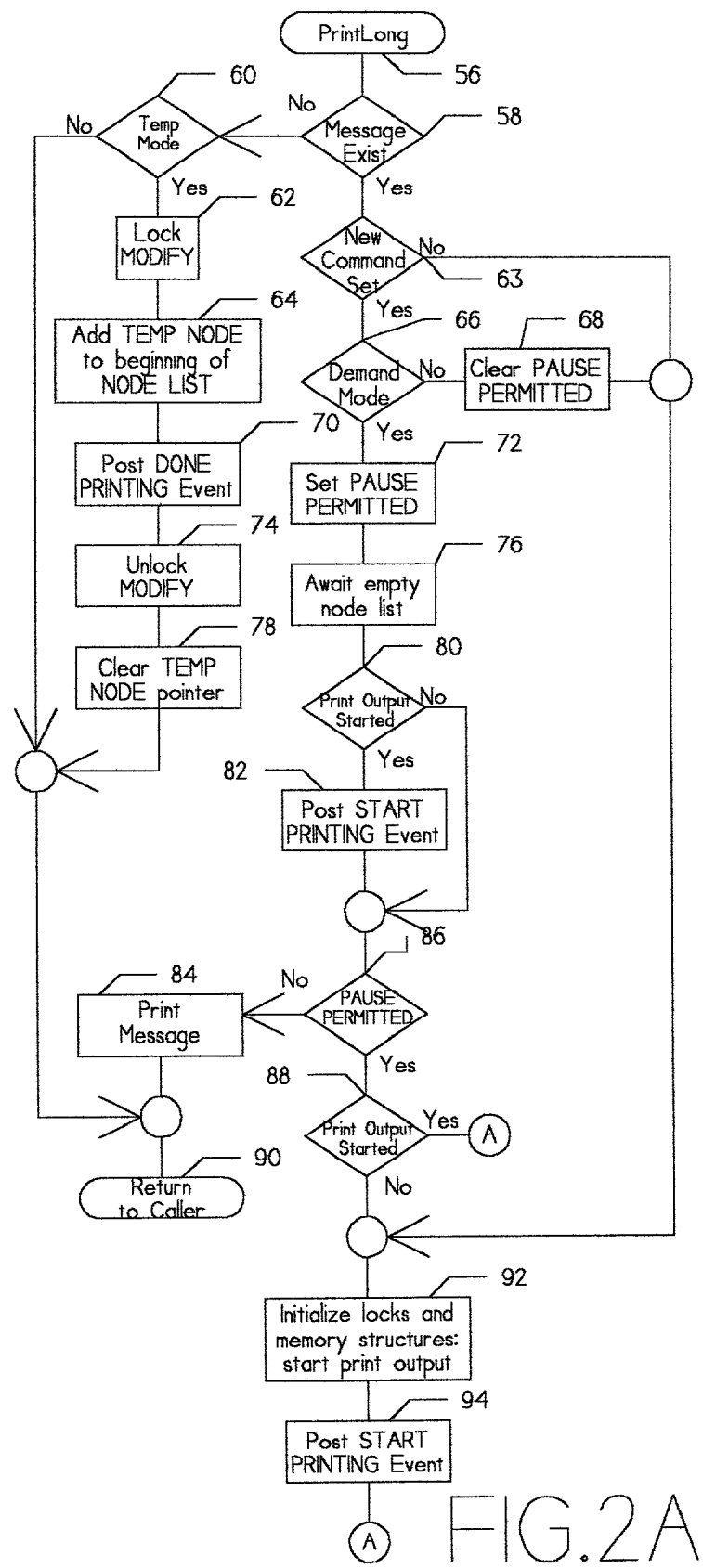
FIGS. 2A and 2B, is a detailed flow chart of the PrintLong routine in accordance with the preferred embodiment of the present invention.
Figure 2B:
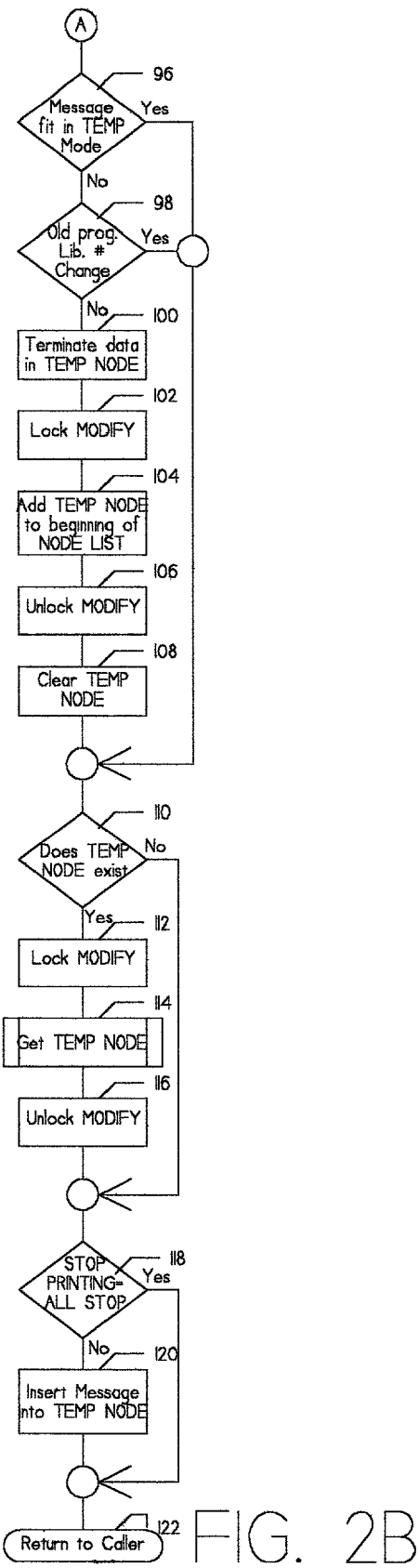

FIG. 2, consisting of FIG. 2A and FIG. 2B, is a detailed flow chart of the software package, PrintLong 54, (see also FIG. 1). Entry is via element 56 (see FIG. 2A) as a result of a procedure call. Element 58 determines whether a message exists. If no, control is given to element 60 to determine if a TEMP NODE exists. If not, control is given to element go for exit from the procedure.

If element 60 finds that a TEMP NODE exists, control is given to element 62 to lock MODIFY (see also FIG. 1, element 40). Element 64 then adds TEMP NODE to the beginning of the NODE LIST. Similarly, element 70 posts a DONE PRINTING event (see also FIG. 1, element 38). Element 74 performs the unlock MODIFY and element 78 clears the TEMP NODE pointer. Control is then given to element go to exit from the procedure.

When element 58 determines that a message exists, control is given to element 63 to determine whether the NEW COMMAND flag is set (see also FIG. 1, element 34). If not set, control is given to element 92 for further processing as described below. If set, control is given to element 66 to determine whether it is Demand Mode. If not, element 68 clears PAUSE PERMITTED (see also FIG. 1, element 30), and control is given to element 92 for further processing.

If element 66 finds the demand mode, element 72 sets the PAUSE PERMITTED Flag. The procedure waits at element 76 for an empty node list. When empty, control is given to element 80 to determine whether the print output task is started. If yes, element 82 posts START PRINTING Event (see also FIG. 1, element 36). In either case, control is then given to element 86 to determine whether the PAUSE PERMITTED flag is set. If not, control is given to element 84 to print the message and exit via element go. If yes, control is given to element 88 to determine if the print output task is started. If there is, control is given to connector A for further processing in accordance with FIG. 2B. If not, element 92 initializes locks and memory structures and starts the print output task. Element 94 sets posts the START PRINTING Event flag (see also FIG. 1, element 36). Processing continues with connector A which is described at the top of FIG. 2B.

FIG. 2B continues the processing of PrintLong at connector A. Element 96 determines whether the message will fit into TEMP NODE. If yes, control is released to element 110 for continuation of processing. If no, element 98 determines if there is a change to the old library program number. If yes, control is released to element 110. Otherwise, element 100 terminates the data in TEMP NODE. Element 102 performs a lock MODIFY (see also FIG. 1, element 40). TEMP NODE is added to the beginning of NODE LIST via element 104. MODIFY is then unlocked at element 106. And TEMP NODE is cleared at element 108.

Processing resumes at element 110 from a number of paths by determining whether TEMP NODE exists. If not, control is given to element 118 for further processing. If yes, element 112 locks MODIFY. Element 114 shows execution of the procedure to fetch TEMP NODE. Element 116 then unlocks MODIFY.

Resuming processing at element 118, a determination is made whether STOP Printing is equal to ALL STOP. If yes, control is given to element 122 for exit. Otherwise element 120 inserts a message into TEMP NODE before exiting at element 122.

FIG. 3, consisting of FIGS. 3A, 3B, 3C, and 3D, is a detailed flow chart showing operation of PrintOutput (see also FIG. 1). Processing begins at FIG. 3A at element 124. Element 126 wait upon the START PRINTING Event Flag (see also FIG. 1, element 36). The PRINT Lock flag (element 32) is set at element 128. Similarly, LOCAL PAUSE PERMITTED Flag 30 is set by element 130.

Lock MODIFY Flag 40 is set by element 132. Then element 134 determines whether the Node is in the NODE LIST. If not, element 136 determines whether DONE PRINTING Flag 38 is set. If not, element 138 unlocks MODIFY Flag 40 and control is returned to element 132. If element 136 determines that DONE PRINTING Flag 38 is not set, element 142 unlocks MODIFY Flag 40, element 144 unlocks PRINT Flag 32, and control is returned to element 126 for further processing.

When element 134 determines that the Node is in the NODE LIST, control is given to element 140 to remove the last node from NODE LIST and set it as TEMP NODE. MODIFY Flag 40 is then unlocked by element 146, and control is given to element 148 to determine whether there is more print data in TEMP NODE. If not, control is given to element 170 (see FIG. 3B) to check for any more nodes to print. If element 148 determines that more data remains, control is given to element 150 to fetch the next data line. Element 152 then prints that data line.

Element 154 determines whether it is necessary to issue a PAUSE. If not, control is given to element 168 (see also FIG. 3B) for determining whether the printing has been completed. If yes, element 156 calls procedure PauseOutput to generate the actual required pause. Following the pause, element 158 determines whether the user has selected a CONTINUE. If so, control is given to element 168. If not, element 160 determines whether the user has selected a STOP. If yes, control is given to element 208 (see also FIG. 3D) for halting of the printing operation. If no, control is transferred to element 162 at FIG. 3B for continued processing.

Figure 3A:
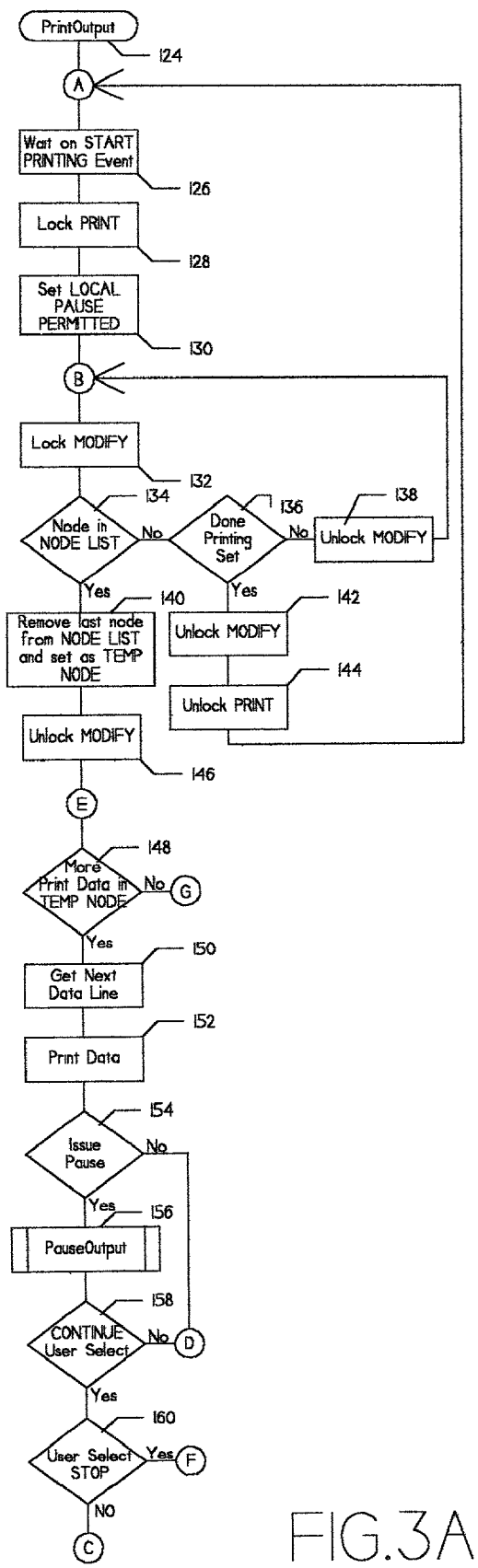
FIGS. 3A, 3B, 3C, and 3D, is a detailed flow chart of the PrintOutput routine.
Figure 3B:
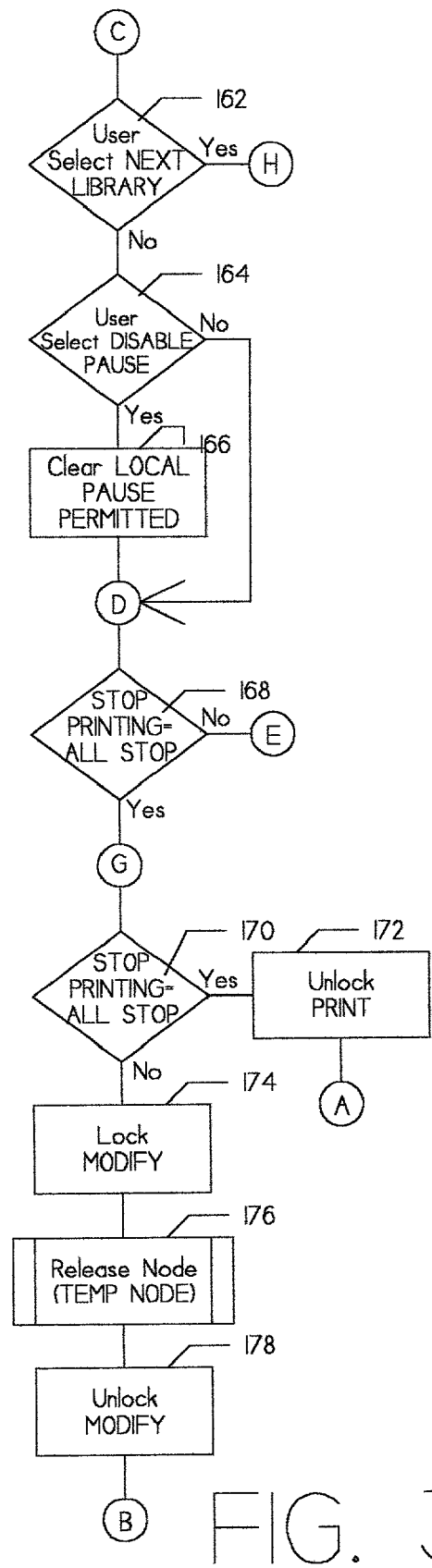

FIG. 3B continues processing at element 162 which determines whether the user has selected NEXT LIBRARY. If yes, control is transferred to element 180 (see also FIG. 3C) to begin releasing the current library's output nodes. If no, element 164 determines whether the user has selected DISABLE PAUSE. If yes, element 166 clears local PAUSE PERMITTED Flag 30 (see also FIG. 1). In either case, processing continues at element 168 which determines whether STOP PRINTING is set to ALL STOP. If not, control is transferred to element 148 (see also FIG. 3A) for continuation of the printing process.

If element 168 determines that the stop printing flag has been set, control is given to element 170 to begin the stop printing process. If all stop, element 172 unlocks PRINT Flag 32 and transfers control to element 125 (see also FIG. 3A) at the beginning of the procedure. If not, element 174 locks the MODIFY Flag and element 176 calls the Release Node procedure for TEMP NODE. A more detailed explanation of the Release Node procedure is found in FIG. 9 and the corresponding discussion below.

After completion of the Release Node procedure, element 178 unlocks the MODIFY Flag and transfers control back to element 132 (see also FIG. 3A) for further processing.

Figure 3C:
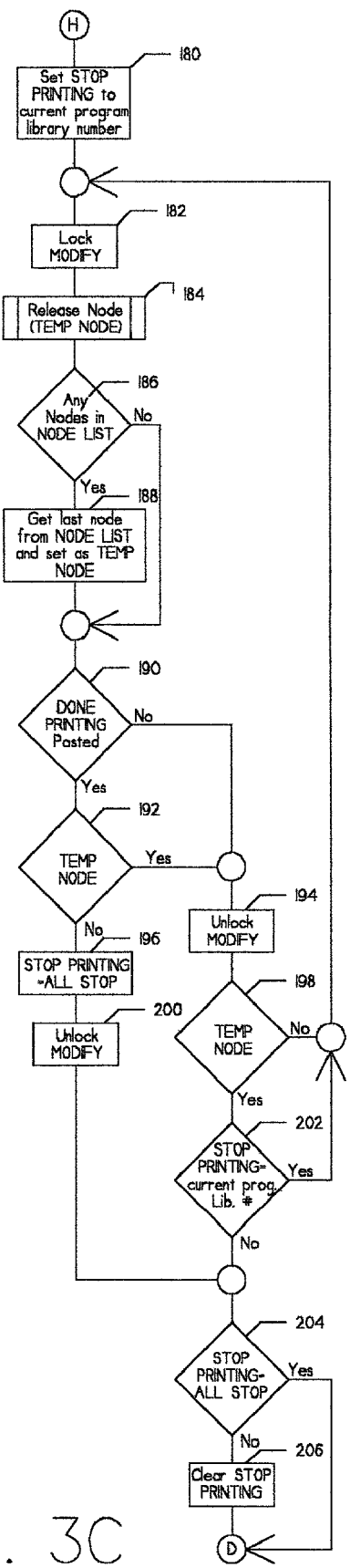

FIG. 3C continues processing whenever element 162 (see also FIG. 3B) determines that the user has selected NEXT LIBRARY. Element 180 sets STOP PRINTING to the current library program number. Element 182 locks the MODIFY Flag. Element 184 calls the Release Node procedure (see also FIG. 9) for TEMP NODE.

A determination of whether any nodes remain in the NODE LIST is made by element 186. If yes, the last node is fetched from NODE LIST and set to TEMP NODE. In either case, control is given to element 190 to determine whether the DONE PRINTING Flag is set. If yes, control is given to element 192 to determine whether TEMP NODE exists. If not, element 196 sets STOP PRINTING to ALL STOP, and element 200 unlocks MODIFY Flag. Control is then given to element 204 for further processing.

If element 190 determines that the DONE PRINTING Flag is not posted or element 192 determines that TEMP NODE does exist, control is given to element 194 which unlocks MODIFY Flag 40. Element 198 then determines whether TEMP NODE exists. If not, control is returned to element 182 for further processing. If yes, element 202 determines whether STOP PRINTING is equal to the current program library number. If yes, control is returned to element 182. If no, element 204 determines whether STOP PRINTING is equal to ALL STOP. If no, element 206 clears STOP PRINTING. In either case, control is transferred to element 168 (see also FIG. 3B) for further processing.

Figure 3D:
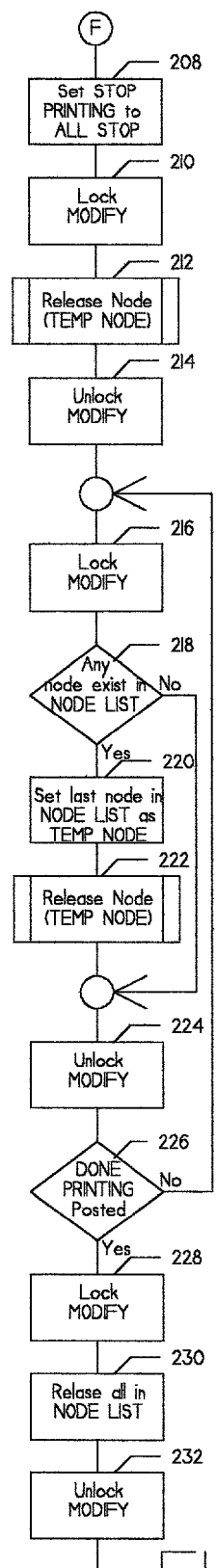

FIG. 3D continues processing after element 160 (see also FIG. 3A) determines that the user has selected a STOP. Element 208 sets STOP PRINTING to equal ALL STOP. Element 210 locks the MODIFY Flag 40. Element 212 calls the Release Node procedure (see also FIG. 9) for TEMP NODE. Element 214 unlocks MODIFY Flag 40.

The lock MODIFY Flag 40 is set by element 216. Element 218 determines whether any nodes exist in NODE LIST. If not, control is given to element 224 for further processing. Otherwise, element 220 sets the last node in NODE LIST to TEMP NODE. Element 222 calls procedure Release Node (see also FIG. 9) for TEMP NODE.

Element 224 unlocks MODIFY Flag 40. A determination of whether DONE PRINTING Flag 38 is set. If no, control is returned to element 216 for further processing. If yes, element 228 locks MODIFY Flag 40. Element 230 releases all entries in NODE LIST. Element 232 unlocks MODIFY Flag 40, and control is transferred to element 168 (see also FIG. 3B) for continued processing.

Figure 4:
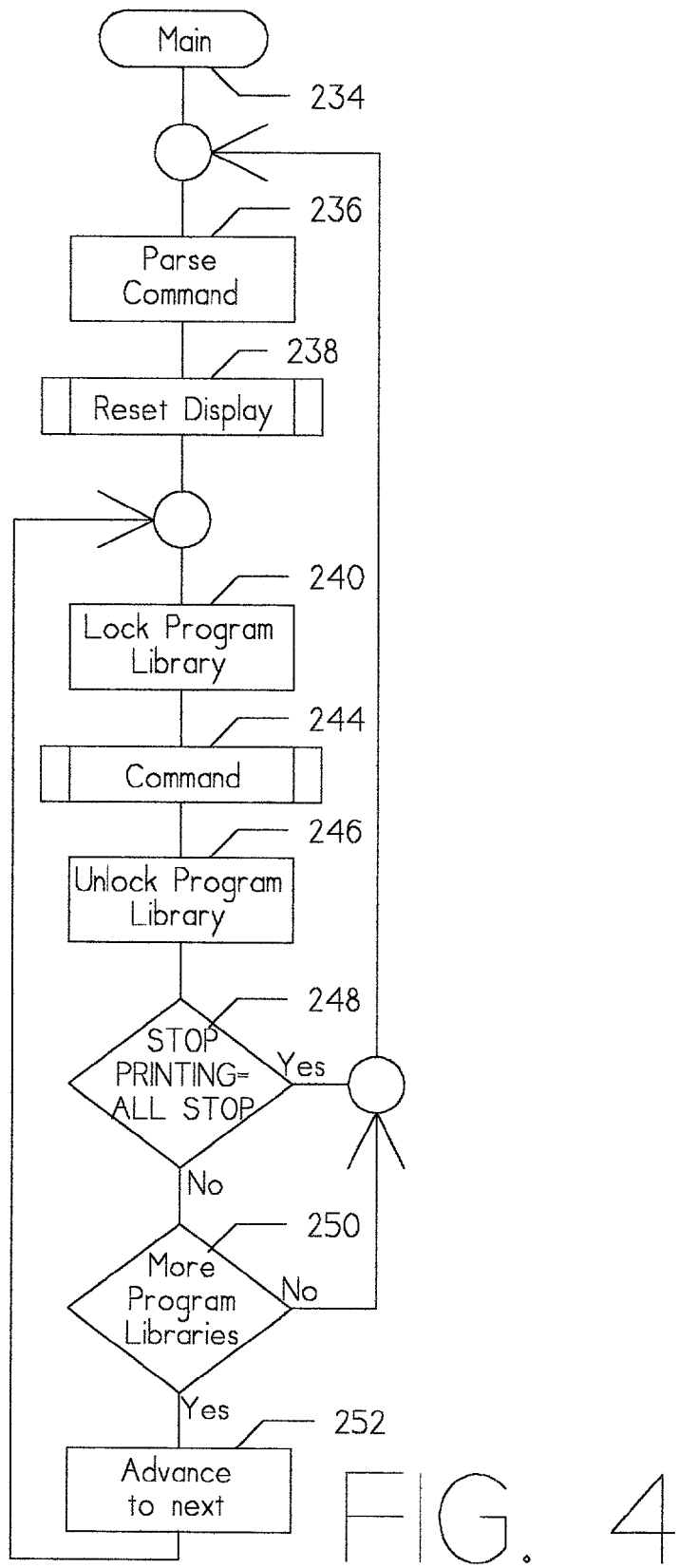
FIG. 4 is a detailed flow chart of the main routine.

FIG. 4 is a detailed flow chart of the procedure MAIN 16 (see also FIG. 1). Entry is via element 234. Element 236 implements the parse command. Procedure Reset Display (see also FIG. 5) is then called by element 238. Element 240 locks the program library, and element 240 calls the appropriate procedure to process the command. Critical Command 20 is detailed in FIG. 6. Non-Critical Command 24 is detailed in FIG. 8.

Program library is unlocked by element 246. Element 248 determines whether STOP PRINTING is equal to ALL STOP. If yes, control is returned to element 236 for further processing. If not, element 250 determines whether there are more program libraries to process. If no, control is returned to element 236. If yes, element 252 advances to the next program library and transfers control to element 240.

Figure 5:
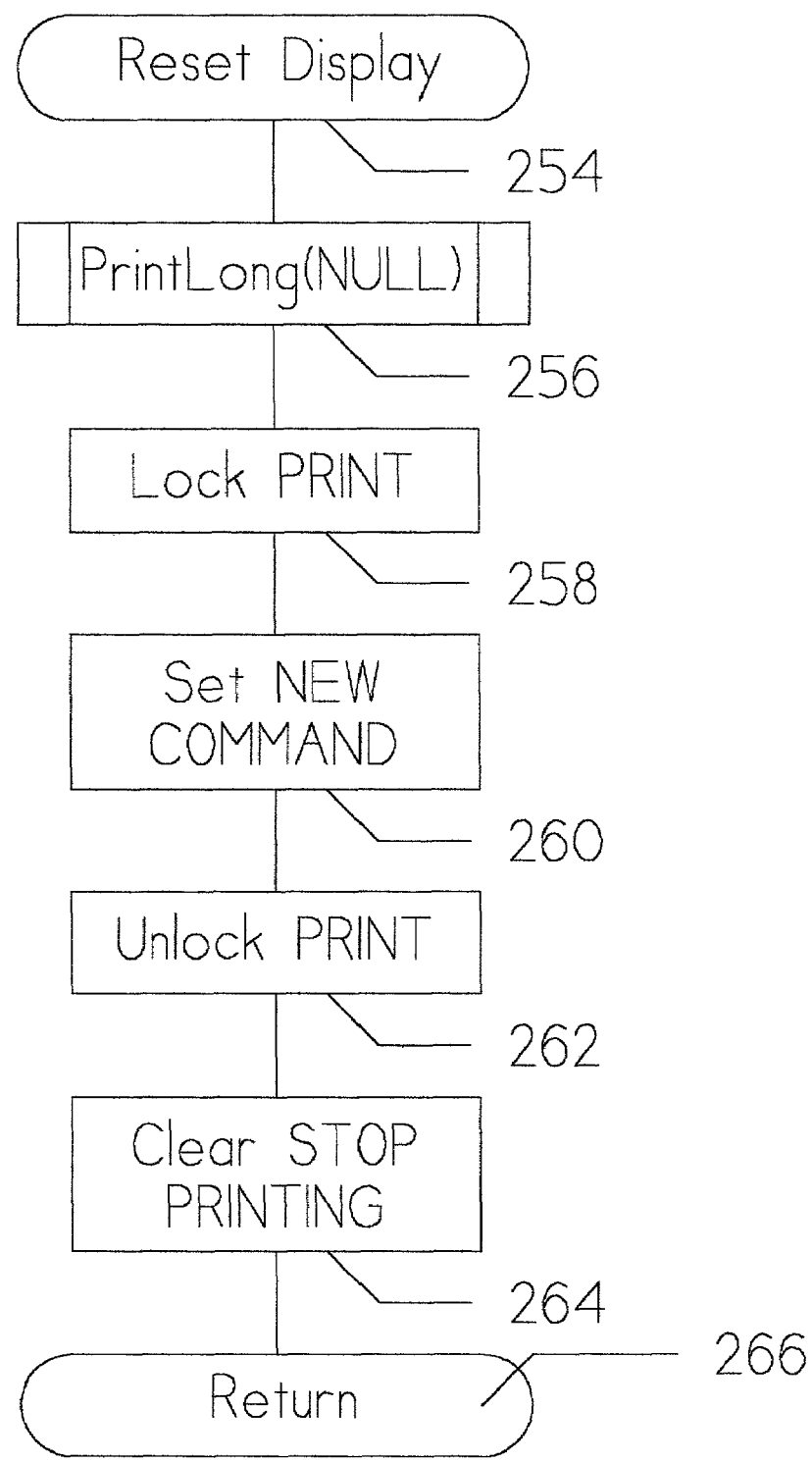
FIG. 5 is a detailed flow chart of the display reset routine.

FIG. 5 is a detailed flow chart showing the operation of the Reset Display procedure. Entry is via element 254. Element 256 calls procedure PrintLong 54 (see also FIG. 2) using a null set. Element 258 sets the print lock, and element 260 sets the new command. Print is unlocked by element 262. STOP PRINTING is cleared by element 264, and exit is via element 266.

Figure 6:
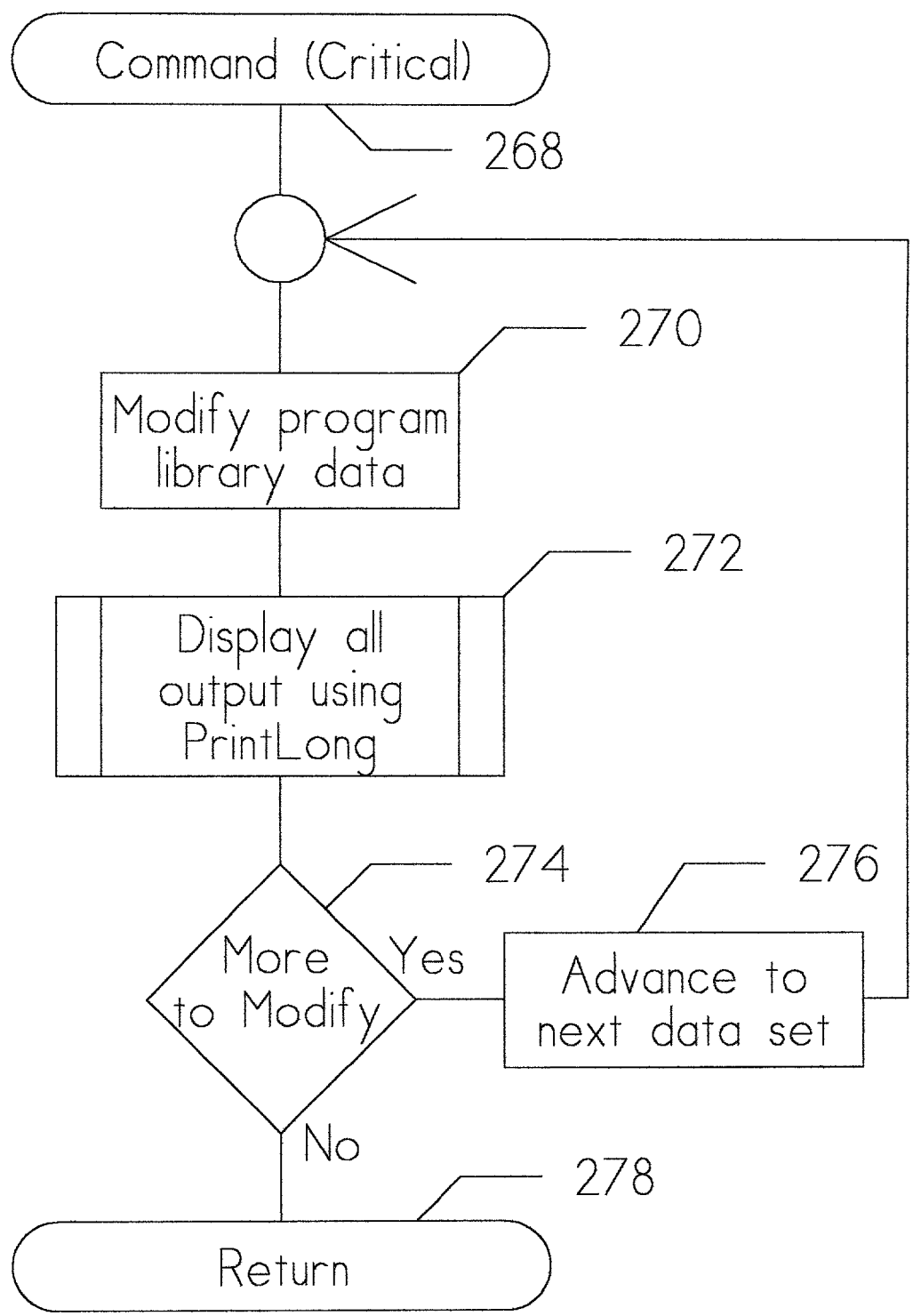
FIG. 6 is a detailed flow chart showing handling of a critical command.

FIG. 6 is a detailed flow chart shows the Command (Critical) 20 procedure. Entry is via element 268. Element 270 modifies the program library data. The PrintLong procedure 54 (see also FIG. 2) is called by element 272. Element 274 determines whether there is more program library data to modify. If yes, element 276 advances routines to the next data set and returns control to element 270. Otherwise, the procedure is exited at element 278.

Figure 7:
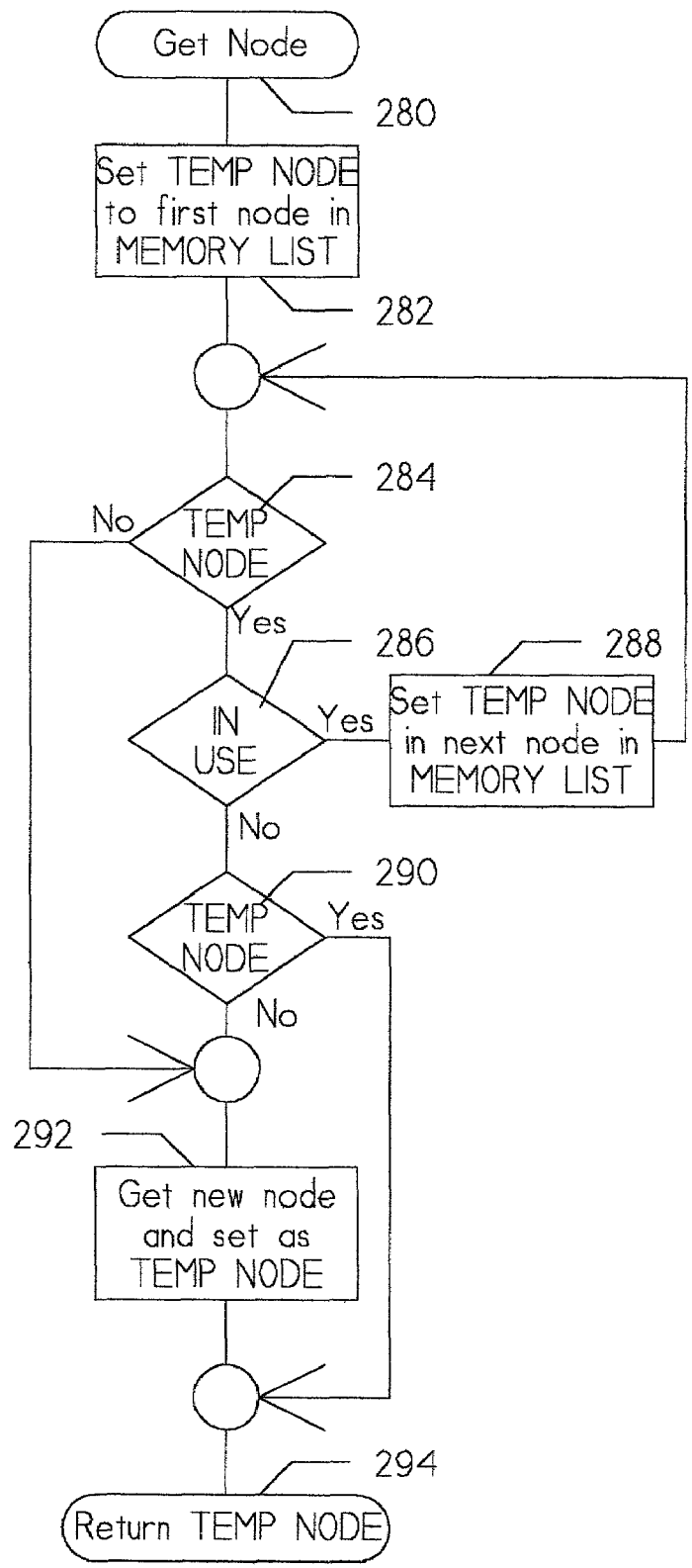
FIG. 7 shows a detailed flow chart of the node fetching routine.

FIG. 7 is a detailed flow chart showing the operation of procedure Get Node. Entry is via element 280. Element 282 sets TEMP NODE to first node in MEMORY LIST. Element 284 determines whether TEMP NODE exists. If not, control is transferred to element 292 to fetch a new node. If yes, element 286 determines whether is set to IN USE. If yes, element 288 sets TEMP NODE in to next node in MEMORY LIST. If not, element 290 determines whether TEMP NODE exists. If yes, control is transferred to element 294 to exit procedure. If not, element 292 gets new node and sets it into TEMP NODE before exiting via element 294.

Figure 8:
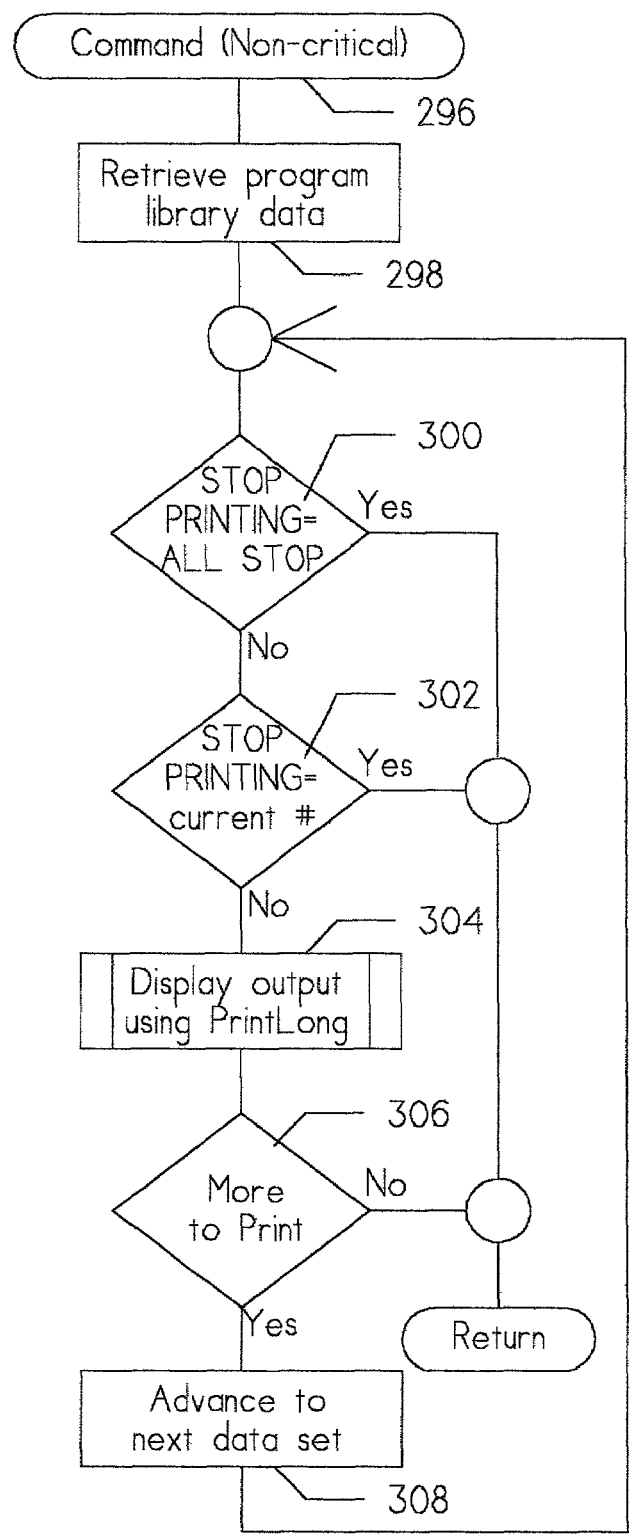
FIG. 8 is a detailed flow chart showing handling of a non-critical command.

FIG. 8 is a detailed flow chart of the Command (Non-critical) procedure 24 (see also FIG. 1). Entry is via element 296. Element 298 retrieves the program library data. A determination of whether STOP PRINTING is equal to ALL STOP is made by element 300. If yes, the procedure is exited. Otherwise, element 302 determines whether STOP PRINTING is equal to the current library program number. If yes, the procedure is exited. Otherwise, element 304 executes Display output using PrintLong 54 (see also FIG. 2).

Element 306 determines whether there is more to print. If not, the procedure is exited. If yes, element 308 advances to the next data set and returns control to element 300 for further processing.

Figure 9:
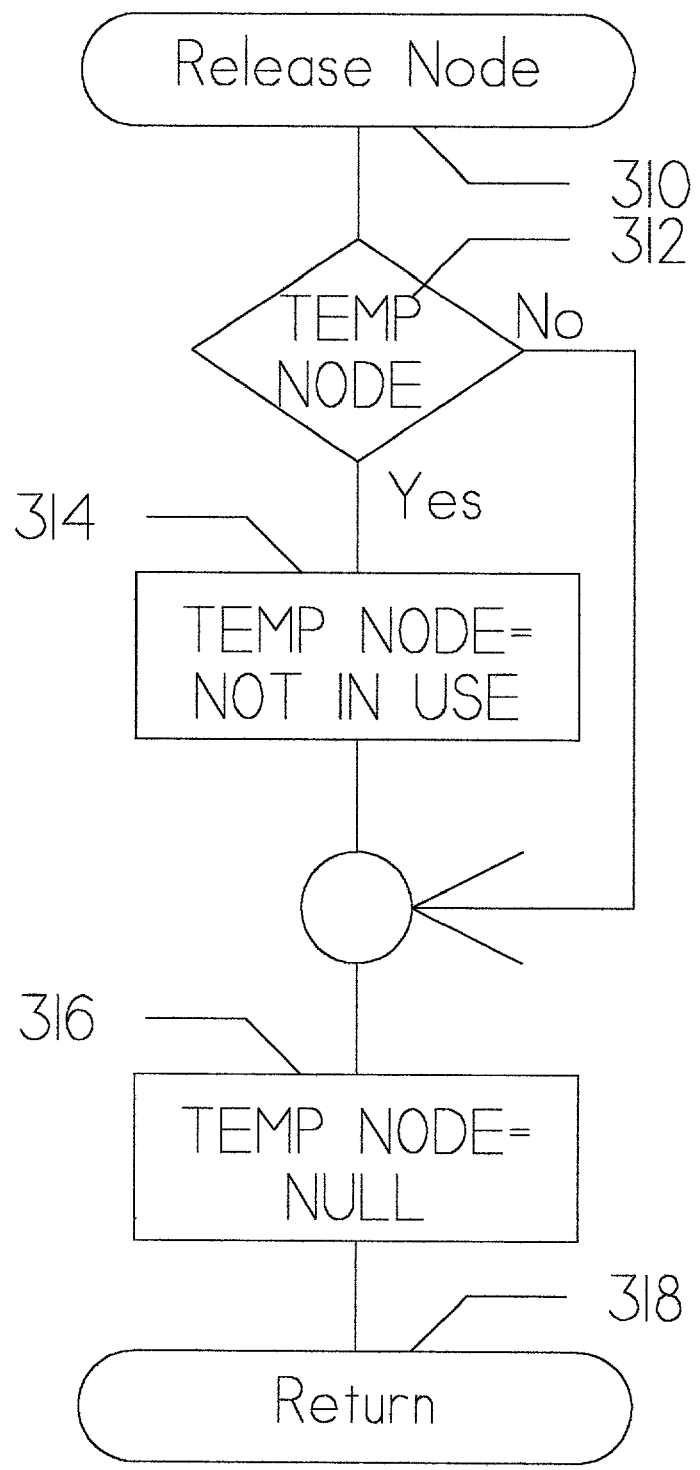
FIG. 9 is a detailed flow chart showing release of a node.

FIG. 9 is a detailed flow chart showing the operation of the Release Node procedure. Entry is via element 310. Element 312 determines whether TEMP NODE exists. If yes, element 314 sets TEMP NODE not is use. In either case, element 316 sets TEMP NODE equal to NULL. Return is via element 318.

Having thus described the preferred embodiments of the present invention, those of skill in the art will be readily able to adapt the teachings found herein to yet other embodiments within the scope of the claims hereto attached.

The invention claimed is:

1. A data processing system comprising:
   a. a mainframe processor with an active application and a plurality of library programs;
   b. a maintenance terminal wherein said maintenance terminal is utilized by a system administrator to perform maintenance functions associated with said data processing system;
   c. wherein said plurality of library programs includes a plurality of software computer programs and wherein said active application is a particular one of said plurality of software computer programs;
   d. a plurality of user terminals responsively coupled to said mainframe processor;
   e. wherein a particular one of said plurality of user terminals utilizes said active application by requesting said mainframe processor to execute said particular one of said plurality of software computer programs; and
   f. a facility located within said mainframe processor which permits said maintenance terminal to print a list of said plurality of library programs without unduly preventing said active application from accessing said plurality of library programs in response to the requesting said listing from said maintenance terminal; said facility receiving said request;
   g. locking accesses to said plurality of library software computer programs to prohibit execution of any of said plurality of library software computer programs;
   h. transferring a list of a first portion of said plurality of library software computer programs to a buffer;
   i. unlocking said accesses to said plurality of library programs to permit execution of any of said plurality of library software computer programs;
   k. outputting contents of said buffer;
   j. repeating g, h, i, and k until all of said plurality of library programs has been listed; and wherein said buffer further comprises a plurality of individual buffers wherein said plurality of individual buffers is alternated.

2. The data processing system according to claim 1 wherein said facility permits said maintenance terminal to request a pause of said printing of said list of said plurality of library programs.

3. The data processing system according to claim 2 wherein said facility permits said maintenance terminal to discontinue said printing of said I plurality of library programs.

4. The data processing system according to claim 3 wherein said facility permits said maintenance terminal to request of a display of other than said listing of said plurality of library programs during said printing.

5. The data processing system according to claim 4 wherein said facility wherein said maintenance terminal requests said listing of said plurality of library programs in a demand mode.

6. A method according to claim 1 wherein said terminal operates in demand mode.

7. A method according to claim 1 wherein step g further comprises a request by said terminal to pause.

8. A method according to claim 1 wherein step g further comprises a request by said terminal to discontinue listing.

9. An apparatus comprising:
   a. a mainframe processor;
   b. a plurality of library software computer programs located within said mainframe processor;
   c. an application software program which is not one of said plurality of library software computer programs located within said mainframe processor and executed by said mainframe processor which calls for execution one of said plurality of library software computer programs;
   d. a maintenance terminal responsively which performs maintenance functions associated with said mainframe processor; and
   e. a facility located within said mainframe processor and responsively coupled to said maintenance terminal which prints a list of said plurality of library software computer programs without unduly restricting execution of said one of said plurality of library software computer programs by said application software program in response to the requesting said listing from said maintenance terminal; said facility receiving said request;
   f. locking accesses to said plurality of library software computer programs to prohibit execution of any of said plurality of library software computer programs;
   g. transferring a list of a first portion of said plurality of library software computer programs to a buffer;
   h. unlocking said accesses to said plurality of library programs to permit execution of any of said plurality of library software computer programs;
   i. outputting contents of said buffer;
   k. repeating f, q, h, and i until all of said plurality of library programs has been listed; and wherein said buffer further comprises a plurality of individual buffers wherein said plurality of individual buffers is alternated.

10. The apparatus according to claim 9 wherein said facility pauses during said printing of said list of said plurality of library software computer programs in response to a first request by said maintenance terminal.

11. The apparatus of claim 9 wherein said facility discontinues said printing, of said list of said plurality of library software computer programs in response to a second request by said maintenance terminal.

12. The apparatus of claim 11 wherein said maintenance terminal displays a presentation other than said listing of said plurality of library software computer programs during said listing.

13. The apparatus of claim 12 wherein said maintenance terminal operates in a demand mode during said printing.

14. An apparatus comprising:
   a. a mainframe processor
   b. a maintenance terminal responsively which performs maintenance functions associated with said mainframe processor;
   c. providing means for providing a plurality of library software computer programs;
   e. executing means responsively coupled to said providing means for executing one of said plurality library software computer programs;
   d. requesting means responsively coupled to said providing means for requesting a printed listing of said plurality of library software computer programs; and
   f. generating means responsively coupled to said providing means and said requesting means for generating said printed listing of said plurality of library software computer programs which permits said executing means to execute said one of said plurality of said library programs while generating of said printed listing in response to the requesting said listing from said maintenance terminal; a facility located within said mainframe processor receives said request;
   g. locking accesses to said plurality of library software computer programs to prohibit execution of any of said plurality of library software computer programs;
   h. transferring a list of a first portion of said plurality of library software computer programs to a buffer;
   i. unlocking said accesses to said plurality of library programs to permit execution of any of said plurality of library software computer programs;
   k. outputting contents of said buffer;
   j. repeating q, h, i, and k until all of said plurality of library programs has been listed; and
   wherein said buffer further comprises a plurality of individual buffers wherein said plurality of individual buffers is alternated.

15. An apparatus according to claim 14 wherein said generating means terminates said printed listing in response to a terminate request from said requesting means.

16. An apparatus according to claim 14 wherein said generating means pauses said printed listing in response to a pause request from said requesting means.

17. An apparatus according to claim 14 wherein said requesting means operates in a demand mode.

18. An apparatus according to claim 14 wherein said requesting means operates in a batch mode.

* * * * *